April 16, 1957  G. M. SWICEGOOD  2,789,014
WHEEL SPACING ARRANGEMENT
Filed Sept. 21, 1953  2 Sheets-Sheet 1
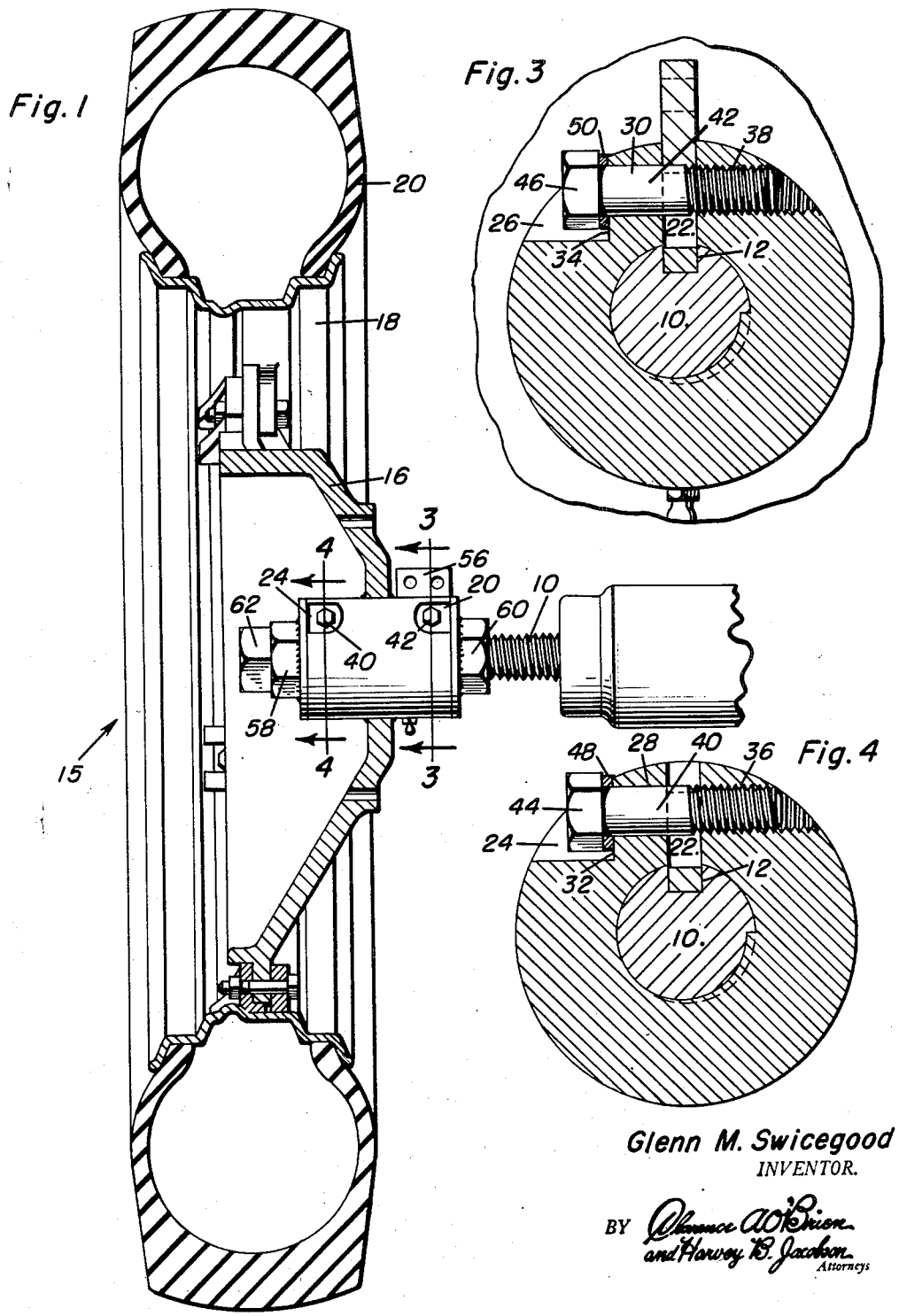
Glenn M. Swicegood
INVENTOR.

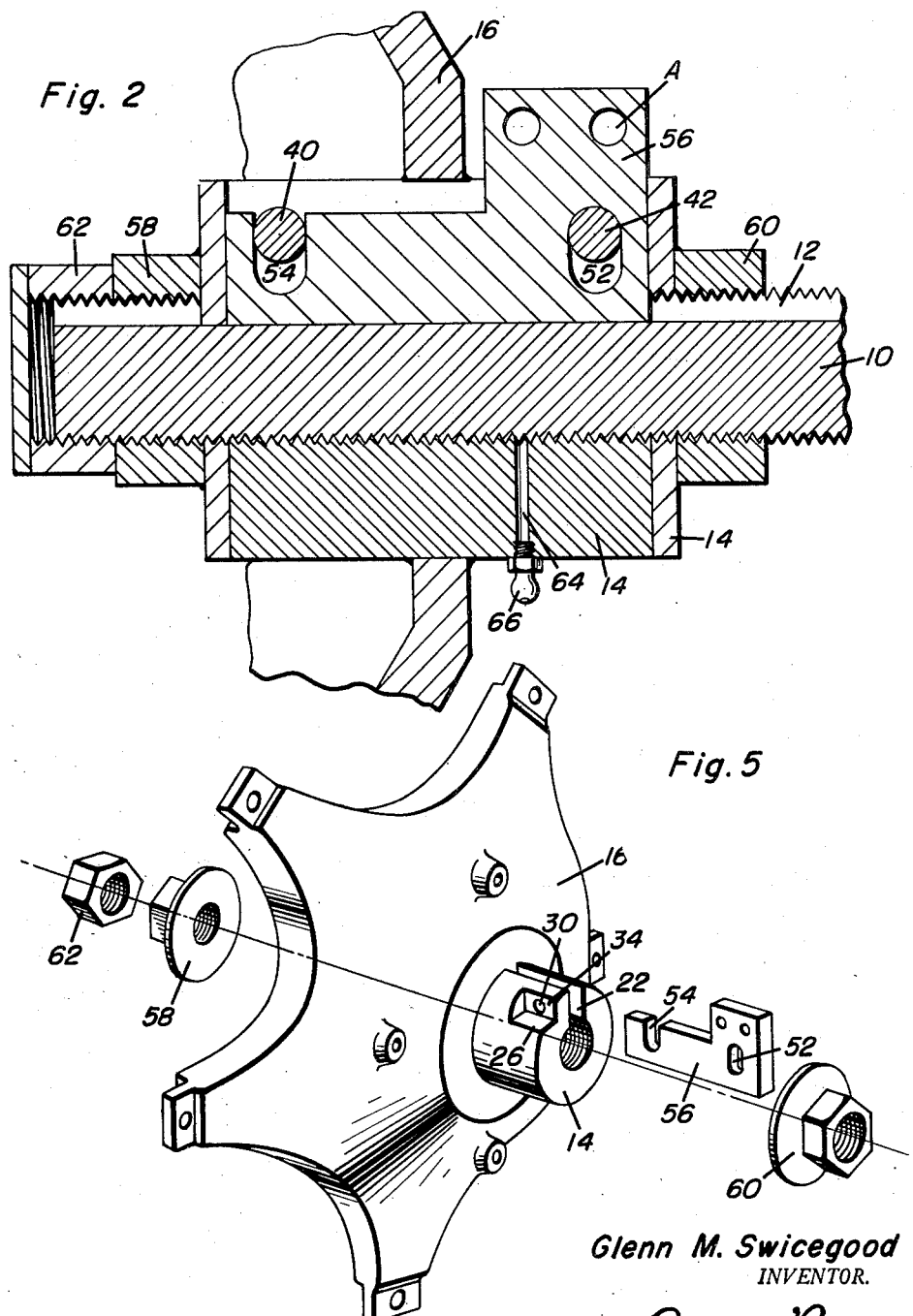

United States Patent Office 2,789,014
Patented Apr. 16, 1957

2,789,014

WHEEL SPACING ARRANGEMENT

Glenn M. Swicegood, Wilson, N. C.

Application September 21, 1953, Serial No. 381,200

1 Claim. (Cl. 301—1)

This invention relates to agricultural equipment and more particularly to a device especially adapted for use in conjunction with farm tractors and like vehicles for adjusting the spacing between the wheels of the tractor for use in conjunction with various crops having differentially spaced rows.

The primary object of this invention resides in the provision of means for varying the spacing of tractor wheels in a simple and convenient manner without necessitating the jacking of the tractor or the removal of the wheels from the tractor.

The construction of this invention features a novel threaded axle having keyways therein for reception of substantially L-shaped keys. One of the most important features of the invention resides in the fact that the hub on which the wheel is mounted is provided with a slot together with spaced recesses on either side of the wheel and in the hub, the recesses being of such shape as to form shoulders for engagement by fasteners so as to hold the hub in frictional engagement with the key so as to frictionally hold the key either in or out of the keyway in the axle. When the key is in the axle the wheel is locked against rotation relative to the axle, but when the key is held in a position out of engagement with the axle, the wheel may rotate relative to the axle thereby space the relationship between the wheels because of the advance of the threads on the axle.

Still further objects and features of this invention resides in the provision of means for spacing the wheels of a tractor which means are strong and durable, simple in construction and manufacture, capable of being readily applied to various of the makes and models of tractors, and in which no part need be removed from the tractor thereby assuring against loss of any important part of the wheel spacing means.

These, together with the various ancillary objects and features of the invention which will become apparent as the following description proceeds, are attained by this wheel spacing arrangement, a preferred embodiment of which has been illustrated in the accompanying drawings, by way of example only, wherein:

Figure 1 is a vertical sectional view, showing the wheel spacing arrangement comprising the present invention;

Figure 2 is an enlarged sectional view illustrating the key in a locked position in the keyway formed in the axle;

Figure 3 is an enlarged vertical sectional view as taken along the plane of line 3—3 in Figure 1;

Figure 4 is another vertical sectional view as taken along the plane of line 4—4 in Figure 1; and Figure 5 is an exploded perspective view illustrating in greater detail the various elements comprising the present invention.

With continuing reference to the accompanying drawings wherein like reference numerals designate similar parts throughout the various views, reference numeral 10 generally designates the axle of a tractor which is externally threaded and which is provided with a keyway 12 in each end thereof. Threadedly received on the axle 10 are the hubs 14 of wheel assemblies generally indicated by reference numeral 15, the wheel assembly 15 including a wheel 16 carrying a rim 18 on which a conventional tractor tire 20 is mounted.

The wheel 16 is secured to the hub 14 by means of welding or other suitable means medial the ends of the hub 14.

The hub 14 is provided with a radially extending slot 22 therein which opens into the peripheral edge of the hub 14 and into the threaded bore thereof. The hub 14 is provided with a pair of recesses 24 and 26 therein. Opening into the recesses 24 and 26 are apertures 28 and 30 which extend normal to the shoulders 32 and 34 formed in the hub 14 by the recesses 24 and 26. The apertures 28 and 30 are partially threaded as at 36 and 38 for threaded reception of fasteners 40 and 42 which are threadedly engaged therein, the fasteners 40 and 42 being provided with heads 44 and 46 adapted to engage the shoulders 32 and 34 respectively.

The fasteners 44 and 46 may be provided with suitable locking washers as at 48 and 50, and extend through an enlarged passageway 52 and a channel 54 formed in the substantially L-shaped key 56 which is adapted to be received in the slot 22 and to extend into the keyway 12 formed in the axle 10. The channel 54 and the passageway 52 are of such size and shape and are so located in the keyway 12 so that selectively the L-shaped key 56 may be seated in the keyway 12 or raised and lifted out of the keyway though lockingly held by the fasteners 40 and 42 in the raised position thereby permitting the hub 14 and hence the wheel assembly 15 to rotate relative to the axle 10. However, when the key 56 extends into the keyway 12 no relative motion between the wheel assembly 15 and the axle 10 is possible. The shoulders 32 and 34 formed by the recesses 24 and 26 are highly important inasmuch as they provide a bearing surface for the fasteners 40 and 42 thereby enabling the key 56 to be frictionally held in either a raised or lowered position.

Also threadedly engaged on the axle 10 for lockingly holding the wheel assembly 15 in its preselected position are locking elements 58 and 60, each comprising an internally threaded nut threadedly received on the axle 10 and having a bearing washer attached thereto as by welding for providing bearing surface for the locking element against the hub 14. A further lock nut 62 is also threadedly engaged on the axle 10 and lockingly engages the locking member 58. Lock nut 62 is also designed to serve as a protection to the threaded end of axle 10.

For assuring ease of operation of the invention there is provided a grease passageway 64 in the hub 14 and a conventional grease fitting 66 which is threadedly secured in the grease passageway 64.

In operation when it is desired to adjust the position of the wheel assembly 15 relative to the axle 10, it is merely necessary to loosen up on the nut 62 and the necessary locking members 58 and 60. Then, after loosening the fasteners 40 and 42 somewhat the key 56 may be raised thereby permitting relative rotation of the wheel assembly 15 and the axle 10. Then, using the drive power of the tractor together with brake pressure on one of the axles 10, the other axle 10 of the tractor and the wheel assembly 15 mounted thereon may be relatively moved until the wheel assembly is in its desired position after which the fasteners 40 and 42 may be again loosened and the key 56 lowered into the keyway 12. Then, the locking members 58 and 60 together with lock nut 62 may be properly positioned.

As will be seen from the foregoing, the construction and advantages of this wheel spacing arrangement are readily apparent, and further description is believed to be unnnecessary.

However, since numerous modifications will readily occur to those skilled in the art, after a consideration of the foregoing specification and accompanying drawings, it is not intended to limit the invention to the precise embodiment shown and described, but all suitable modifications and equivalents may be readily resorted to, falling within the scope of the appended claim.

What is claimed as new is as follows:

A tractor wheel assembly for use in combination with a threaded axle comprising a rim carrying wheel mounted on a hub, said hub having an internally threaded bore, said hub being threadedly engaged on said threaded axle, a radial slot in said hub opening into said bore, a pair of apertures through said hub on opposite sides of said wheel extending perpendicularly to and intersecting said slot, a pair of recesses in said hub in alignment with said apertures, said recesses defining shoulders extending normal to said apertures, portions of said apertures being threaded, a keyway in said axle, a key received in said slot, and fasteners threadedly secured in said slot adapted to abut said shoulders to lockingly hold said key in said slot and selectively in and out of said keyway, said key being of substantially L-shape and having an enlarged channel opening into one edge thereof and an enlarged completely enclosed passageway therethrough, said fasteners extending through said channel and said passageway, said fastener extending through said passageway maintaining at least a portion of said key in said slot to prevent accidental loss of said key, and locking members received on said threaded axle engaging said hub lockingly holding said wheel assembly on said axle in an adjusted position.

References Cited in the file of this patent

UNITED STATES PATENTS

| | | |
|---|---|---|
| 164,609 | Thomas | June 15, 1875 |
| 512,984 | Millholland | Jan. 16, 1894 |
| 831,745 | Rice | Sept. 25, 1906 |
| 2,324,681 | Dekker | July 20, 1943 |
| 2,584,410 | Abney | Feb. 5, 1952 |